United States Patent [19]

Karas

[11] Patent Number: 4,827,383
[45] Date of Patent: May 2, 1989

[54] SELF-ADJUSTING HEADLIGHT SYSTEM FOR VEHICLES

[76] Inventor: Michael Karas, Iron River, Alberta, Canada, T0A 2A0

[21] Appl. No.: 184,685

[22] Filed: Apr. 22, 1988

[51] Int. Cl.$^4$ ............................................. B60Q 1/00
[52] U.S. Cl. ...................... 362/61; 362/66; 362/286
[58] Field of Search ............. 362/61, 80, 267, 286, 362/66

[56] References Cited

U.S. PATENT DOCUMENTS

| | | | |
|---|---|---|---|
| 1,524,385 | 1/1925 | Broerman | 362/248 |
| 2,270,458 | 1/1942 | McAdoo | 362/61 |
| 4,004,142 | 1/1977 | Pärsson | 362/78 |

FOREIGN PATENT DOCUMENTS 2019997 11/1979 France ................................ 362/61

Primary Examiner—Stephen F. Husar
Assistant Examiner—Sue Llagarman
Attorney, Agent, or Firm—Dickstein, Shapiro & Morin

[57] ABSTRACT

The present invention provides a self-adjusting headlight system for vehicles to maintain proper forward vertical alignment of the headlight even when the vehicle is unevenly loaded in the front to rear direction. The system comprises a housing which is secured to the body of the vehicle. A headlight frame is provided, within which the headlight is mounted. The frame is mounted on a pivot secured to the housing, to pivot freely about a horizontal axis. The frame is balanced on the pivot so that the beam of the headlight is normally properly forwardly aligned. The balance means comprises a pendulum downwardly extending from the frame on an arm. A portion of the pendulum is attractive to magnetism. An electromagnet is secured to the car body and positioned in the vicinity of that portion of the pendulum so as, when actuated, to secure the pendulum and hence the headlight frame, in that particular relative position with respect to the car body. The electromagnet is actuable by a driver as required. When the electromagnet is actuated, the headlight frame is balanced on the pivot so that the headlights are properly positioned, in the vertical plane, and held in that position until the electromagnet is deactuated.

3 Claims, 1 Drawing Sheet

SELF-ADJUSTING HEADLIGHT SYSTEM FOR VEHICLES

BACKGROUND OF THE INVENTION

The present invention relates to a headlight system for vehicles, and more particularly to a self-adjustable headlight system for maintaining proper forward alignment of the headlights even when the vehicle is unevenly loaded in the front-to-read direction.

A current problem faced with most vehicles such as pickup trucks, which may carry heavy loads which are supported unevenly in the front to rear direction, is that, at night-time, the resultant positioning of the headlights may be such that they are improperly aligned in a vertical plane. For instance, if the load is at the rear of the vehicle, the lights may be oriented too high, so that they do not properly shine on the roadway surface but instead shine at the eye level of an oncoming driver who then faces blinding bright lights. Such a dangerous problem may be solved by not hauling loads in such trucks at night, or by resetting the headlights of the truck with a screw driver to lower their beam.

Of background interest is U.S. Pat. No. 2,270,458 of McAdoo issued Jan. 20, 1942, which describes and illustrates a dampened pendulum which is linked by a bar to headlights which are arranged to pivot about a horizontal axis. The pendulum swings the headlights to and holds them in an appropriate position when, for example, a vehicle travels up an inclined road. Canadian Pat. No. 180,029 of Colburn issued Oct. 30, 1917 describes and illustrates a somewhat similar construction of pendulum arrangement, linked by bars to a pair of headlights pivotable about a horizontal axis for swinging the vehicle headlights in a vertical plane to tilt the headlights when driving up or down hills. Another reference of general background interest is Canadian Pat. No. 245,739 of Redding issued Dec. 30, 1924, describing and illustrating a system of headlight pivotable about a vertical axis.

OBJECTS OF THE INVENTION

It is an object of the present invention to provide a self-adjusting headlight system for vehicles which will maintain proper forward alignment of the headlights when the vehicle is unevenly loaded in the front to rear direction.

SUMMARY OF THE INVENTION

In accordance with the present invention there is provided a self-adjusting headlight system for vehicles to maintain proper forward vehicle alignment of each headlight beam even when the vehicle is unevenly loaded in the front to rear direction. The system comprises a housing for each headlight which is secured to the body of the vehicle. A headlight frame is provided, within which the headlight is mounted. The frame is mounted on a pivot secured to the housing to pivot freely about a horizontal axis. A balance means is associated with the frame. The balance means comprises a pendulum downwardly extending from the frame on an arm, a portion of the pendulum being attractive to magnetism. An electromagnet is secured to the vehicle body and positioned in the vicinity of the portion of the pendulum so as, when actuated, to secure the pendulum and hence the headlight frame, in that particular relative position with respect to the car body. A means actuable by a driver is provided to actuate the electromagnet as required. The headlight frame is balanced with respect to the pivot so that the headlight is properly positioned, in the vertical plane, and held in that position during actuation of the electromagnet.

In a preferred embodiment of the present invention, the means for actuating the electromagnet is electrically associated with the light switch for the vehicle headlights, so that that means is actuated while the vehicle lights are turned on. As well, the pendulum extends outwardly, from either side of the end of the arm, to form an arc with the arm in the center thereof, the pivot forming its center of curvature. Moreover, the arm is provided with means for lateral displacement of the arm, for example by means of hinging separate portions of the arm, to permit the pendulum to abut against the electromagnet when actuated so that the pendulum is held in that position and not permitted to pivot while the electromagnet is actuated.

The headlight system according to the present invention may be easily installed in an old or new vehicle, and is effective to maintain the vehicle headlights in a proper forward alignment, even when the vehicle may be heavily loaded at the rear.

BRIEF DESCRIPTION OF THE DRAWINGS

These and other objects and advantages of the invention will become apparent upon reading the following detailed description and upon referring to the drawings in which.

Figure 1:
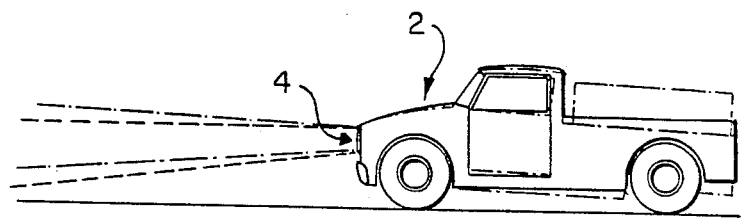
FIG. 1 is a side, schematic view of a heavily loaded pickup truck illustrating the problem addressed by the headlight system according to the present invention.

While the invention will be described in conjunction with an example embodiment, it will be understood that it is not intended to limit the invention to such embodiment. On the contrary, it is intended to cover all alternatives. modifications and equivalents as may be included within the spirit and scope of the invention as defined by the appended claims.

DETAILED DESCRIPTION OF THE INVENTION

In the following description, similar features in the drawings have been given similar reference numerals.

Turning to the drawings, and in particular FIG. 1, there is shown a truck 2 with a conventional set of non-adjustable headlights 4, illustrating the problem for which the construction of the present invention provides a solution. In particular, since the truck of FIG. 1 has been heavily loaded at its rear, the headlights 4 of the truck, at night-time, will shine in an upward direction as illustrated, and not in the proper direction forwardly and slight downwardly towards the road. This upward shining of the headlights creates a danger to oncoming drivers, because of the brightness of the lights shining towards such oncoming driver. As well, because headlights 4 are not properly downwardly focused, the driver of that truck cannot properly see the roadway surface at night-time.

Figure 2:
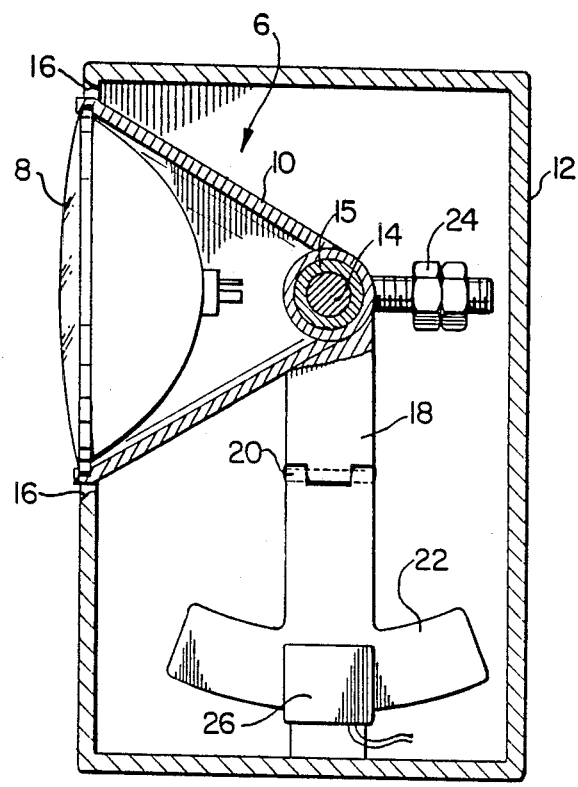
FIG. 2 is a section plan view of a headlight system according to the present invention.

A proper orientation of headlight in truck 2, to provide a beam as shown in chain line in FIG. 1, by utilizing a headlight system 6, is illustrated in FIG. 2. In particular, as will be described in more detail hereinafter, headlight system 6 is self-adjusting, ensuring a proper forward alignment of the beam of the headlight 8 to compensate for example for uneven loading in the front of the vheicle 2 in the front to rear direction.

In accordance with the invention, headlight 8 is mounted within a retainer housing 10 which in turn is secured to the vehicle body through housing frame 12. Headlight retainer housing 10 is pivotally mounted, at pivot 14 and bushing 15 within housing frame 12 as illustrated, so that retainer housing 10 can pivot freely about pivot 14, preferably a limited amount as dictated for example by circumscribing edges 16 of housing frame 12. Pivot 14 is horizontally oriented, in a direction transverse to the longitudinal axis of the vehicle body.

Downwardly depending from headlight retainer housing 10 is an articulated arm 18, the sections of which are secured together by means of hinge 20. At the lower end of articulated arm 18 is an elongated, arcuate balancing weight or pendulum 22, the curvature of which conforms to a segment of a circumference drawn from pivot 14. Headlight retainer housing 10 is also provided with a counterweight 24. The headlight 4, retainer housing 10, articulated arm 18, pendulum 22 and counterweight 24 are arranged so that, when the truck 2 is in perfectly level, horizontal position, the beam of headlight 8 is properly oriented, in the forward direction and in the vertical plane, for proper high and low beam driving. As well, headlight 8 is thereby balanced so that, for example, when the truck is loaded from the rear, causing the truck body to be lower at its rear than at its front, headlight retainer housing 10 will pivot about pivot 14 sufficiently to maintain a proper forward orientation of the beam of headlight 8.

To maintain pendulum 22, headlight retainer housing 10 and headlight 8 in proper orientation, an electromagnet 26 is mounted on housing frame 12 as illustrated, in the vicinity of pendulum 22. Pendulum 22 would for example be 3/16 of an inch away from electromagnet 26 when the electromagnet is not operational. Appropriate circuitry (not illustrated) connects electromagnet 26 to the electric circuitry operating headlight 8, preferably so that when the lights of truck 2 are turned on by the appropriate switch by the driver of truck 2, activation of that switch also, simultaneously, activates electromagnet 26. When electromagnet 26 is activated, pendulum 22 will then swing, on hinge 20, to rest against electromagnet 26 thus creating friction that would cause headlight 8 and pendulum 18 to remain in that particular position while the vehicle is in motion with headlight 8 illuminated. Thus, with the truck ignition off and the vehicle loaded, before the headlights are turned on, headlight retainer housing 10, articulated arm 18, pendulum 22 and counterweight 24 balance by pivoting about pivot 14, so that light 8 is positioned properly, in the vertical plane, for night-time driving. Once the ignition is on and the headlights are activated, electromagnet 26 locks the lights 8 in that position and the vehicle is ready to operate.

Thus it is apparent that there has been provided in accordance with the invention a self-adjusting headlight system for vehicles that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed as my invention:

1. A self-adjusting headlight system for vehicles for maintaining proper forward vertical alignment of each headlight beam even when the vehicle is unevenly loaded in the front to rear direction, the system comprising
    (a) a housing for each headlight secured to the body of vehicle;
    (b) a headlight frame within which the headlight is mounted, the frame being mounted on a pivot secured to the housing to pivot freely about a horizontal axis;
    (c) balance means associated with the frame, the balance means comprising a pendulum downwardly extending from the frame on an arm, a portion of the pendulum being attractive to magnetism, the arm being divided into two sections, the sections being hinged together to permit lateral movement of the arm and pendulum;
    (d) an electromagnet secured to the vehicle body and positioned in the vicinity to said portion of the pendulum so as, when actuated, to move the arm and pendulum laterally towards it to permit the pendulum to abut against the electromagnet so that the pendulum is held in that position and not permitted to pivot while the electromagnet remains actuated, and thereby to secure the headlight frame in that particular relative position with respect to the car body; and
    (e) means actuable by a driver to actuate the electromagnet as required; the headlight frame being balanced, with respect to the pivot, so that the headlight remains properly forwardly aligned, in a vertical plane, during actuation of the electromagnet.

2. A headlight system according to claim 1 wherein the means for actuating the electromagnet is electrically associated with a light switch for the vehicle headlights, so that said means is actuated while the vehicle lights are turned on.

3. A system according to claim 2 wherein the pendulum extends outwardly, to either side of the end of the arm and forms an arc with the arm in the center thereof, the pivot forming its center of curvature.

* * * * *